B. F. SINGER & T. CLARK.
DISH WASHING MACHINE.
APPLICATION FILED DEC. 15, 1908.
933,591.
Patented Sept. 7, 1909.
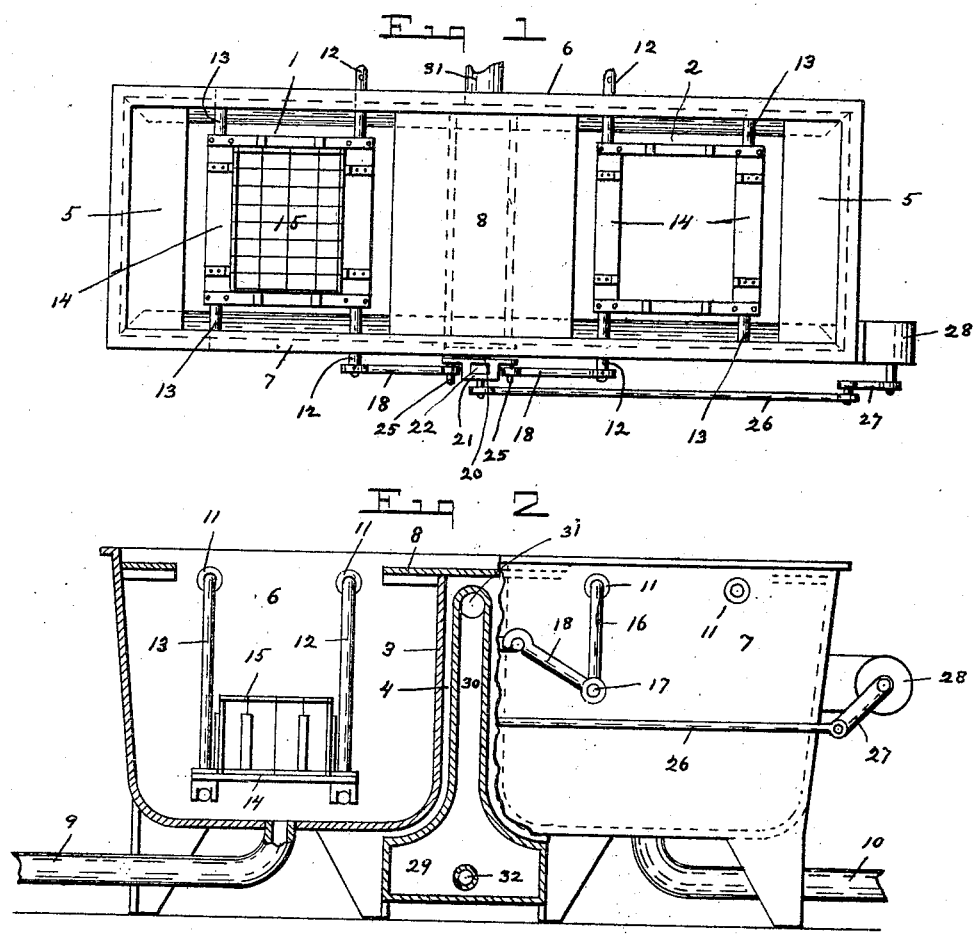
WITNESSES:
James E. Boyle
Mabel L. Lefevre
INVENTORS,
Benjamin F. Singer,
and Thomas Clark,
BY
John J. Thompson
ATTORNEY

UNITED STATES PATENT OFFICE.

BENJAMIN F. SINGER AND THOMAS CLARK, OF LANCASTER, PENNSYLVANIA.

DISH-WASHING MACHINE.

933,591. Specification of Letters Patent. Patented Sept. 7, 1909.

Application filed December 15, 1908. Serial No. 467,600.

*To all whom it may concern:*

Be it known that we, BENJAMIN F. SINGER and THOMAS CLARK, citizens of the United States, residing at Lancaster, in the county of Lancaster and State of Pennsylvania, have invented certain new and useful Improvements in Dish-Washing Machines, of which the following is a specification, reference being had therein to the accompanying drawing.

This invention is an improvement upon Letters Patent No. 904,731, granted to us on November 24, 1908, for a dish-washing machine, and consists in an improved and novel form of tank and method of applying heat thereto, and also in so arranging the operating levers that they may be changed from one side to the other in case of breakage, and further, of supplying the tanks with guards or splashers.

While we have here described and claimed our invention as herewith shown in the accompanying drawings, it is fully understood that we do not confine ourselves to the exact construction and combination of parts as herewith shown, as slight changes may be made in the construction and combination of parts without departing in any way from the spirit of the invention.

In the accompanying drawings forming a part of this application, and in which like figures of reference indicate corresponding parts in all the views:—Figure 1, is a top plan view, showing the washing and rinsing compartments with the splash boards in place. Fig. 2, is a front elevation, partly in section, showing the interior of one compartment and the heating chamber formed between the compartments. Fig. 3, is a partial front elevation, showing the operating levers and the door to the heating chamber.

Referring to the drawings, the tank consists in the two compartments 1, and 2, which are formed with curved bottoms, and have their inner or adjacent end walls 3, spaced apart and forming the chamber 4, which is closed upon the sides by the sides 6, and 7, of said tank, but which is open upon the bottom. Within said compartments 1, and 2, are secured, near the upper part thereof, the end splash boards 5, and upon the tops of the end walls 3, and between the sides 6, and 7, is secured the central splash board 8, which projects within said compartments and also serves as a top for the heating chamber 4. Said compartments 1, and 2, are provided with suitable drain pipes 9, and 10, and may also be provided with water inlet pipes near their upper edges.

Mounted in bearings 11, in the sides 6, and 7, near the upper ends thereof, are the swing hangers 12, and 13, which support the detachable basket frames 14, within which rest the baskets 15, to hold the dishes. The swing hangers 12, are provided with the downwardly extending arms 16, pinned or otherwise detachably secured and may be thus secured upon either end of said hangers 12, for operating said hangers from either side of the tank. Said arms 16, extend downward outside of the tank and terminate in a crank pin 17, upon which is mounted a connecting link 18, formed with a hooked end.

Upon the outer surface of both of the tank sides 6, and 7, near the lower part thereof, is secured a stud plate 19, formed with a stud 20, and upon which is pivoted the lower end of a handle casing 21, which is formed with an orifice 22, in the body thereof, to receive the detachable handle 23. Said casing being also formed with lugs 24, and the crank pins 25, which are adapted to engage the hooked end of the links 18, thus providing means to reciprocate the disk holders.

By providing the hangers with extending ends upon both sides of the tank and a stud plate 19, upon each of said sides, the handle casing 21, the links 18, and the arms 16, may be operated upon either side of said tank, or the apparatus may be operated by a connecting rod 26, attached to the crank 27, of a motor 28, mounted upon the end of said tank.

The heating apparatus consists of the heater 29, which is formed with the dome 30, extending upward and within the chamber 4, and spaced from the end walls 3, to form an air space, while the upper end of the heater dome 30, may be provided with the vent pipe 31, and the bottom with a gas or steam supply pipe 32, which may be in the form of a coil extending upward in the dome 30, or said heater may be arranged for wood or coal, and access may be had thereto through the fire door 33, provided in the lower part of the sides 6, and 7.

The uses and operations of the machine are so simple that it is deemed that they will be readily understood without further explanation.

Having thus described our invention what we claim as new and desire to secure by Letters Patent is:—

1. A washing apparatus of the class described, comprising two compartments having their adjacent end walls spaced from each other and their sides integral, a removable heater formed with a dome and adapted to be contained within the chamber formed by the spaced end walls of said compartments.

2. In a machine of the class described, two compartments having their adjacent end walls spaced from each other, and their sides extended toward each other and integral therewith forming a chamber, a splash board secured upon the upper edges of said adjacent end walls and forming a cover for said chamber, and a heater formed with a dome and detachably secured within said chamber.

In testimony whereof we affix our signatures in presence of two witnesses.

BENJAMIN F. SINGER.
THOMAS CLARK.

Witnesses:
W M. J. COULTER,
MABEL L. LEFEVRE.